US010668323B2

(12) United States Patent
Chang

(10) Patent No.: US 10,668,323 B2
(45) Date of Patent: Jun. 2, 2020

(54) PEDALING VIBRATIONAL APPARATUS

(71) Applicant: Chung-Fu Chang, Changhua County (TW)

(72) Inventor: Chung-Fu Chang, Changhua County (TW)

( * ) Notice: Subject to any disclaimer, the term of this patent is extended or adjusted under 35 U.S.C. 154(b) by 33 days.

(21) Appl. No.: 15/860,068

(22) Filed: Jan. 2, 2018

(65) Prior Publication Data

US 2019/0201741 A1    Jul. 4, 2019

(51) Int. Cl.
*A63B 22/18* (2006.01)
*B06B 1/16* (2006.01)
(Continued)

(52) U.S. Cl.
CPC .......... *A63B 22/18* (2013.01); *A63B 22/0605* (2013.01); *B06B 1/167* (2013.01);
(Continued)

(58) Field of Classification Search
CPC ........ A63B 21/00058; A63B 21/00061; A63B 21/00065; A63B 21/00069; A63B 21/00072; A63B 21/00076; A63B 21/00178; A63B 21/00181; A63B 21/00185; A63B 21/00189; A63B 21/00196; A63B 21/008; A63B 21/0083; A63B 21/0085; A63B 21/0087; A63B 21/02; A63B 21/021; A63B 21/022; A63B 21/023; A63B 21/025; A63B 21/026; A63B 21/028; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/0608; A63B 21/0615; A63B 21/0616; A63B 21/0617; A63B 21/068; A63B 21/15; A63B 21/151; A63B 21/154; A63B 21/155; A63B 21/156; A63B 21/157; A63B 21/158; A63B 21/159; A63B 21/22; A63B 21/225; A63B 21/227; A63B 21/4027; A63B 21/4033; A63B 21/4034;
(Continued)

(56) References Cited

U.S. PATENT DOCUMENTS 4,477,072 A * 10/1984 DeCloux ............ A63B 22/0605
    482/4
4,586,706 A *  5/1986 Chen .................. A63B 22/0012
    482/62
(Continued)

*Primary Examiner* — Gary D Urbiel Goldner
(74) *Attorney, Agent, or Firm* — Karin L. Williams; Mayer & Williams PC

(57) ABSTRACT

A pedaling vibrational apparatus includes a seat body, a pedal assembly, a gear plate assembly, a drive assembly and an eccentric assembly, like a lever structure. By treading the pedal assembly, the gear plate assembly drives the drive assembly to rotate. The drive assembly is connected with the eccentric assembly. A user can fully exercise muscles of the user's body during exercise, and a vibrational effect generated by the eccentric assembly can stimulate acupuncture points of the user's body to improve blood circulation. Left and right pedals of the pedal assembly can be treaded in turn to continuously drive a gear to rotate in a same direction so as to achieve an effect of acceleration and to enhance vibrations.

7 Claims, 14 Drawing Sheets

(51) Int. Cl.
*F16H 19/04* (2006.01)
*A63B 22/06* (2006.01)
*F16H 1/06* (2006.01)
*F16H 7/02* (2006.01)
*F16H 1/00* (2006.01)

(52) U.S. Cl.
CPC ............... *F16H 1/003* (2013.01); *F16H 1/06* (2013.01); *F16H 7/023* (2013.01); *F16H 19/04* (2013.01)

(58) Field of Classification Search
CPC ............ A63B 21/4041; A63B 21/4045; A63B 21/4047; A63B 21/4049; A63B 22/0015; A63B 22/0017; A63B 22/0046; A63B 22/0048; A63B 22/0056; A63B 22/0058; A63B 22/06; A63B 22/0605; A63B 22/0635; A63B 22/0647; A63B 22/16; A63B 22/18; A63B 22/20; A63B 22/201; A63B 22/203; A63B 22/208; A63B 2022/206; A63B 23/035; A63B 23/03516; A63B 23/03533; A63B 23/04; A63B 23/0405; A63B 23/0429; A63B 23/0476; A63B 23/0482; A63B 23/0488; A63B 23/0494; A63B 26/00; A63B 26/003; A63B 69/0028; A63B 69/0035; A63B 69/16; A63B 71/0054; A63B 2071/0063; A63B 2071/0072; A63B 2208/0204; A63B 2225/09; A63B 2225/093; A63B 2225/096
See application file for complete search history.

(56) References Cited

U.S. PATENT DOCUMENTS

| | | | | |
|---|---|---|---|---|
| 4,753,435 A * | 6/1988 | Carnielli | ............ | A63B 22/0012 482/57 |
| 5,298,002 A * | 3/1994 | Lin | ............ | A63B 22/0058 482/53 |
| 5,411,454 A * | 5/1995 | Chang | ............ | A61H 7/00 482/148 |
| 5,645,512 A * | 7/1997 | Yu | ............ | A63B 22/0064 482/147 |
| 5,807,210 A * | 9/1998 | Devlin | ............ | A63B 22/0056 482/146 |
| 5,833,583 A * | 11/1998 | Chuang | ............ | A63B 22/0664 482/60 |
| 5,888,175 A * | 3/1999 | Chang | ............ | A63B 22/0064 482/147 |
| 6,595,899 B2 * | 7/2003 | Liang | ............ | A63B 22/0056 482/51 |
| 6,669,604 B1 * | 12/2003 | Lee | ............ | B62M 23/00 482/57 |
| 6,712,739 B1 * | 3/2004 | Chen | ............ | A63B 22/0056 482/53 |
| 6,921,353 B2 * | 7/2005 | Chuang | ............ | A63B 22/0058 482/146 |
| 6,997,854 B2 * | 2/2006 | Yang | ............ | A63B 22/0056 482/53 |
| 7,048,675 B1 * | 5/2006 | Liang | ............ | A63B 22/0056 482/53 |
| 7,530,928 B2 * | 5/2009 | Liao | ............ | A63B 21/159 482/53 |
| 7,878,960 B1 * | 2/2011 | Liu | ............ | A63B 22/0058 482/146 |
| 7,901,332 B1 * | 3/2011 | Wen | ............ | A63B 22/205 482/51 |
| 8,109,860 B2 * | 2/2012 | Lo | ............ | A63B 5/00 482/123 |
| 9,623,282 B2 * | 4/2017 | Tung | ............ | A63B 21/0552 |
| 9,776,031 B2 * | 10/2017 | Ho | ............ | A63B 21/0455 |
| 10,166,424 B2 * | 1/2019 | Chang | ............ | A63B 21/005 |
| 2003/0008750 A1 * | 1/2003 | Liang | ............ | A63B 22/0056 482/53 |
| 2003/0064864 A1 * | 4/2003 | Tang | ............ | A63B 21/068 482/52 |
| 2005/0209058 A1 * | 9/2005 | Yu | ............ | A63B 22/0056 482/52 |
| 2006/0240950 A1 * | 10/2006 | Chang | ............ | A63B 22/0064 482/52 |
| 2007/0021276 A1 * | 1/2007 | Kuo | ............ | A63B 21/005 482/62 |
| 2007/0021277 A1 * | 1/2007 | Kuo | ............ | A63B 21/157 482/62 |
| 2008/0026916 A1 * | 1/2008 | Chuang | ............ | A63B 22/0064 482/53 |
| 2009/0011906 A1 * | 1/2009 | Fernandez | ............ | A63B 5/11 482/52 |
| 2010/0190614 A1 * | 7/2010 | Hong | ............ | A63B 21/015 482/57 |
| 2010/0248923 A1 * | 9/2010 | Lo | ............ | A63B 5/00 482/146 |
| 2014/0274585 A1 * | 9/2014 | Huang | ............ | A63B 23/10 482/79 |
| 2015/0238798 A1 * | 8/2015 | Liu | ............ | A63B 22/16 482/127 |
| 2015/0306451 A1 * | 10/2015 | Arnold | ............ | A63B 22/0015 482/4 |
| 2016/0151659 A1 * | 6/2016 | Arnold | ............ | A63B 22/0015 482/4 |
| 2016/0263434 A1 * | 9/2016 | Snyderman | ............ | A63B 23/0476 |
| 2017/0274237 A1 * | 9/2017 | Chang | ............ | A63B 21/005 |
| 2019/0183725 A1 * | 6/2019 | Chang | ............ | A63B 21/4034 |

* cited by examiner

PEDALING VIBRATIONAL APPARATUS

FIELD OF THE INVENTION

The present invention relates to fitness equipment, and more particularly, to a pedal-type vibrational apparatus capable of generating vibrations by treading pedals to enhance an exercise effect without requiring electric power.

BACKGROUND OF THE INVENTION

There is a vibration machine, also known as a blood circulation machine developed on the market. When the user stands on a vibration machine, the vibration machine generates vibrations to stimulate the soles of the feet, so that the blood flows to the soles of the feet. In the process of vibration, the user's body, such as the abdomen and legs, can swing together, providing an effect of outdoor sports. Besides, the space occupied by a vibration machine is small. Most of vibration machines can be stored easily. The vibration machine can be unfolded in a narrow space for use.

However, the drawback of this exercise machine is that the exercise machine needs electric power to drive a motor, so that an internal vibration unit can be actuated to generate vibrations. Due to the arrangement of the motor and other components, the overall structure is quite complicated and the human body is vibrated by the vibration machine. Therefore, the posture of use is limited, with less fun.

In order to solve the problem that the existing vibration machine needs electric power and has complicated structure, China Patent No. CN103705363B discloses an "non-motorized fat-burning machine". The non-motorized fat-burning machine includes a base and a vibrating seat. The middle portion of the base is provided with a first shaft. The middle portion of the vibrating seat is connected with the first shaft and can swing relative to the base. A second shaft parallel to the first shaft is fixed on the vibrating seat. The vibrating seat, at both sides of the second shaft, is pivoted with left and right rotating shafts. The left and right rotating shaft are equipped with left and right eccentric wheels. Unidirectional bearings are mounted between the left and right eccentric wheels and the left and right rotating shafts, respectively. The left and right rotating shafts are fixedly connected with driven gears, respectively. The base is fixedly connected with a first gear. The second shaft is sleeved with a second gear to mesh with the first gear. The second gear drives the driven gears on the left and right rotating shafts to rotate through a gear transmission mechanism. Through the gear transmission mechanism, the rotational speed of the driven gears on the left and right rotating shafts is greater than the rotational speed of the second gear.

The above structure does solve the defect of the electrically powered vibrating fitness equipment, however, the inventor finds that this patent still has the following defects: (1) The drive mode of this patent, as shown in FIG. 5 and FIG. 6, uses a bevel gear to drive a driven gear connected with the bevel gear. But in this design when the left and right sides of a cover ascend to a certain position, the mechanism may be jammed or cannot be operated smoothly. The reason is that the driven gears are rotated in different directions. When the cover is horizontal, there will be a jammed problem. (2) A further drawback of this patent is that since the driven gear is further connected to the eccentric wheel. It can be understood that when the pedals are treaded, the vibration is not continuous and the action is not smooth. In this design, the instantaneous clockwise/counterclockwise rotation easily leads to damage the connected teeth.

In the above structure, the unidirectional bearings are mounted between the left and right eccentric wheels and the left and right rotating shafts. The left and right rotating shafts are fixedly connected with the driven gears, respectively. Therefore, the left and right eccentric wheels are subjected to the respective unidirectional gears, one of the eccentric wheels is rotated, and the unidirectional bearing of the other eccentric wheel is idling without acceleration, reducing its vibrational effect. Moreover, the number of the components increase, resulting in increased costs. It really needs to be improved.

Accordingly, the inventor of the present invention has devoted himself based on his many years of practical experiences to solve these problems and develop a non-motorized pedal-type vibrational apparatus which has much fun and can enhance the blood circulation.

SUMMARY OF THE INVENTION

The primary object of the present invention is to provide a pedal-type vibrational apparatus. A pedal assembly drives a drive assembly to link an eccentric assembly to generate vibrations when the user treads pedals.

Another object of the present invention is to provide a pedal-type vibrational apparatus which is mainly man-powered to drive the whole structure so that it can be used at any time without consuming electric power. When in use, in addition to maintaining a balance, the user can fully exercise the muscles of the body to enhance metabolism.

A further object of the present invention is to provide a pedal-type vibrational apparatus which provides gear plates to drive a first linking gear and a second linking gear. The first linking gear and the second linking gear are provided with unidirectional bearings therein. Therefore, when rotated, a first transmission gear connected on a first linking shaft is rotated in a single direction. When the stepping frequency increases, the eccentric assembly can be accelerated to enhance the vibrational effect.

In order to achieve the aforesaid object, the pedal-type vibrational apparatus of the present invention comprises a seat body, a pedal assembly, a gear plate assembly, a drive assembly, and an eccentric assembly.

The seat body includes an I-shaped bottom base and a support frame. The pedal assembly, the gear plate assembly, the drive assembly and the eccentric assembly are mounted to the support frame. The support frame is provided with a plurality of shaft holes for mounting the pedal assembly, the gear plate assembly, the drive assembly and the eccentric assembly.

The pedal assembly is mounted on the seat body. The pedal assembly includes a main rod, a secondary rod, and two pedals. The main rod is axially connected to the support frame through a first shaft. The first shaft serves as a rotation center. Two ends of the main rod are provided with first mounting portions, respectively. The main rod is provided with a curved groove. The secondary rod is mounted to a lower end of the main rod under the first shaft. The secondary rod is connected through at least one second shaft passing through the curved groove of the main rod. The second shaft serves as a lower support member when the main rod is swung. Two ends of the secondary rod are provided with second mounting portions, respectively. The two pedals each have a pedal portion and a connecting portion. The connecting portion has an upper connecting hole and a lower connecting hole. The upper connecting holes of the two pedals are connected with the first mounting portions, respectively. The lower connecting holes of the two pedals are connected with the second mounting portions, respectively.

The gear plate assembly includes a first gear plate and a second gear plate. The first gear plate is mounted between the support frame and the main rod. The second gear plate is mounted between the secondary rod and the drive assembly. The first gear plate has a first curved surface corresponding to the curved groove. The first curved surface abuts against a lower end of the second shaft. The first gear plate has a lower curved gear rack. The second gear plate has a second curved surface. The second curved surface abuts against the lower end of the second shaft. The second gear plate has an upper curved gear rack.

The drive assembly includes a first linking gear, a second linking gear, a first linking shaft, a first transmission gear, and a second transmission gear. The first linking gear, the second linking gear, the first linking shaft and the first transmission gear are coaxially arranged. The first linking gear is meshed with the lower curved gear rack. The second linking gear is meshed with the upper curved gear rack. The first linking gear and the second linking gear are turned in opposite directions. Unidirectional bearings are mounted in the first linking gear and the second linking gear so that first linking shaft is rotated in a single direction. The first transmission gear is mounted on the first linking shaft. The second transmission gear includes a small gear and a large gear. The small gear is meshed with the first transmission gear. The big gear drives the eccentric assembly to rotate.

The eccentric assembly includes an gear and an eccentric block. The gear is meshed with the big gear and driven by the big gear to rotate. The eccentric block is mounted on the gear and driven by the gear to rotate.

Through the above components, the user stands on the pedals and treads the pedals back and forth through the left and right feet. The main rod and the secondary rod generate a lever effect through the pedals, so that the first gear plate and the second gear plate are driven to swing back and forth. The multiple transmission of the drive assembly enables the eccentric assembly to rotate to generate vibrations. The first linking gear and the second linking gear generate one-way rotation for the first linking shaft. When the stepping frequency is high, the eccentric assembly can be accelerated to enhance the vibrational effect.

Therefore, in addition to maintaining a balance, the user can fully exercise the muscles of the body during exercise, and the vibrational effect can stimulate the acupuncture points of the feet and legs to improve the blood circulation and metabolism functions to achieve the purpose of physical health.

Preferably, the bottom base is provided with a plurality of cushion pads.

Preferably, the connecting portion of each of the pedals is provided with a cushion unit, and the cushion unit is an elastic cushion.

Alternatively, the connecting portion of each of the pedals is provided with a cushion unit, and the cushion unit is a compression spring.

Preferably, the first transmission gear and the big gear each have a large number of teeth and a large size to drive the small gear and the gear.

Preferably, the pedal-type vibrational apparatus further comprises a housing to cover the seat body. The first mounting portions and the second mounting portions extend out of an outer side of the housing to form connecting shafts. The outer side of the housing is mounted with a rotating disc. The rotating disc is fitted on the connecting shafts. By rotating the rotating disc, the pedal assembly is actuated for the eccentric assembly to generate vibrations.

Preferably, the outer side of the housing is selectively connected with a rotatable seat pad. The seat pad is provided with a bracket for a user to rest his/her legs thereon. When the user sits on the seat pad to swing, the drive assembly and the eccentric assembly in the housing are driven to rotate to generate vibrations.

Preferably, the first gear plate and the second gear plate of the gear plate assembly are mounted to the second mounting portions. When the pedals are treaded, the first gear plate and the second gear plate use the first shaft as the rotation center to drive the first linking gear and the second linking gear so that the drive assembly drives the eccentric assembly to rotate.

Preferably, the gear plate assembly is assembled to be one-piece. The lower curved gear rack and the upper curved gear rack are formed on the same gear plate. The lower curved gear rack is meshed with a third linking gear. The upper curved gear rack is meshed with a fourth linking gear. The first linking gear, the second linking gear and the third linking gear are coaxially arranged. The fourth linking gear is axially connected with a fifth linking gear. The fifth linking gear is meshed with the second linking gear. The first linking gear and the second linking gear are provided with the unidirectional bearings. When the gear plate assembly is driven by the pedal assembly, the third linking gear is driven to drive the first linking gear or the second linking gear to rotate in a direction. The fourth linking gear and the fifth linking gear rotate toward one side. The first linking gear is rotated idly in a certain direction through the unidirectional bearings so that the first linking shaft is rotated in the same direction.

Preferably, the drive assembly selectively uses a pulley and a transmission belt or uses a sprocket and a chain.

Through the above structure, the present invention can provide the following effects:

1. The present invention can choose a variety of drive ways for the overall structure to generate a vibrational effect. Manufacturers can provide different types of products, such as an economy mode and a durable mode, according to the exercise state of different users. Each structure allows users to fully exercise every part of the body. The vibrational effect can stimulate the feet and legs to accelerate metabolism for health.

2. The present invention provides a variety of ways to use, not only a monotonous and single use, allowing users to exercise anytime, anywhere.

3. The present invention does not require the use of electricity, so it will not increase the electricity charge, achieving the advantages of exercise and energy saving.

4. Because the first linking gear and the second linking gear are connected through a unidirectional bearing, the first transmission gear can be driven to rotate in the same direction regardless of the forward or reverse rotation of the first linkage shaft during the operation. As the frequency of treading the pedals increases, the eccentric assembly can be accelerated to increase the vibrational effect.

DETAILED DESCRIPTION OF THE PREFERRED EMBODIMENTS

Figure 1:
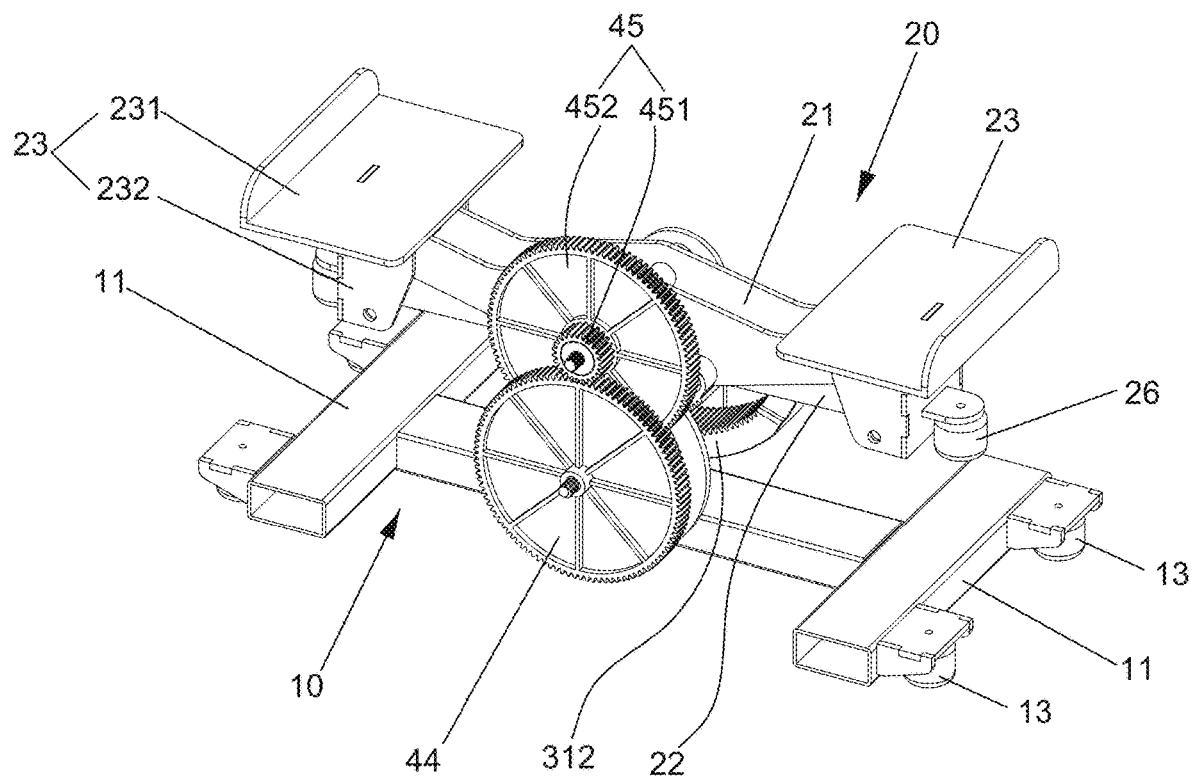
FIG. 1 and FIG. 2 are perspective views of the present invention.
Figure 2:
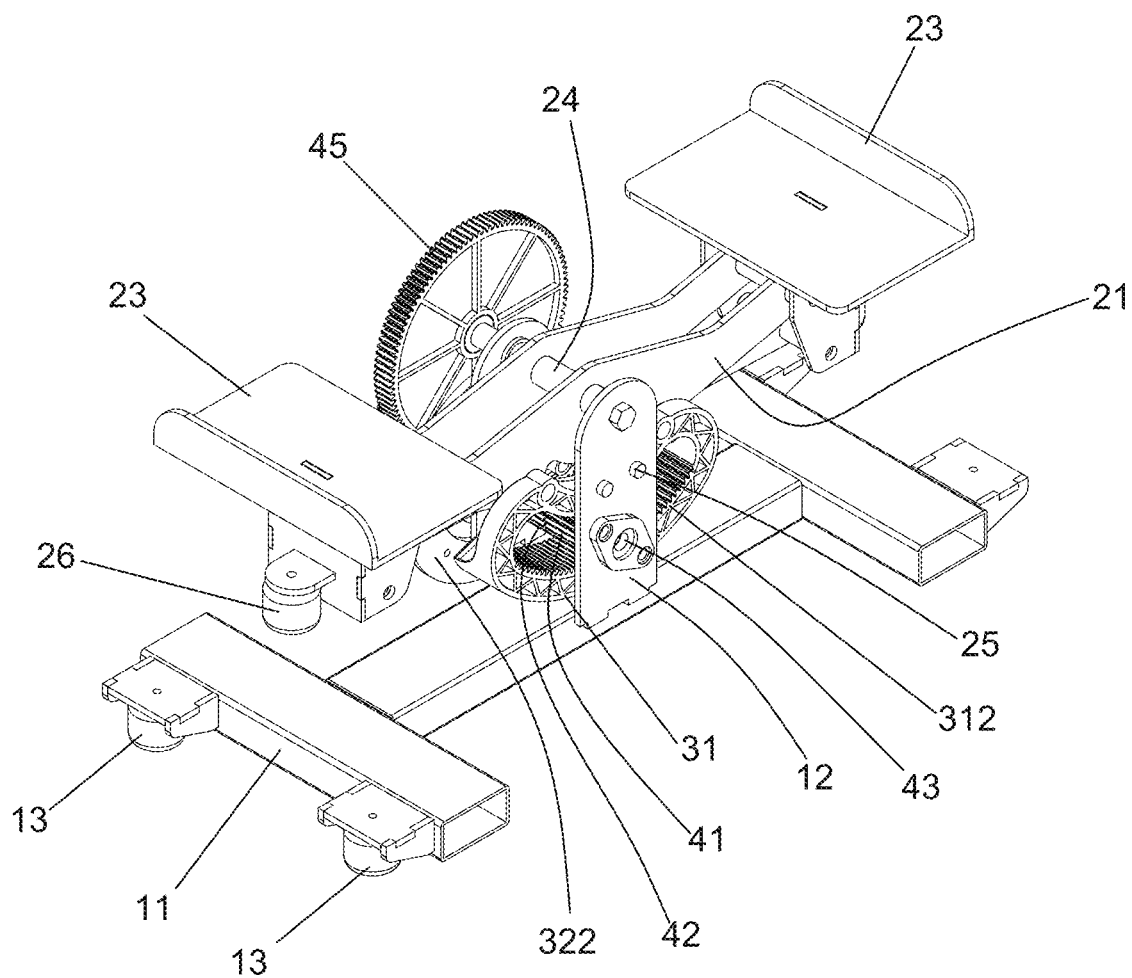

Embodiments of the present invention will now be described, by way of example only, with reference to the accompanying drawings.

Referring to FIG. 1 to FIG. 10, a pedal-type vibrational apparatus according to a first embodiment of the present invention comprises a seat body 10, a pedal assembly 20, a gear plate assembly 30, a drive assembly 40, and an eccentric assembly 50.

As shown in FIG. 1 to FIG. 10, the seat body 10 includes an I-shaped bottom base 11 and a support frame 12. The pedal assembly 20, the gear plate assembly 30, the drive assembly 40 and the eccentric assembly 50 are mounted to the support frame 12. The support frame 12 is provided with a plurality of shaft holes for mounting the pedal assembly 20, the gear plate assembly 30, the drive assembly 40 and the eccentric assembly 50. As shown in FIG. 1 to FIG. 10, the bottom base 11 is provided with a plurality of cushion pads 13. When in use, the pedal-type vibrational apparatus of the present invention is not directly contact with the ground, so it won't generate noises and the overall structure can be protected.

Figure 3:
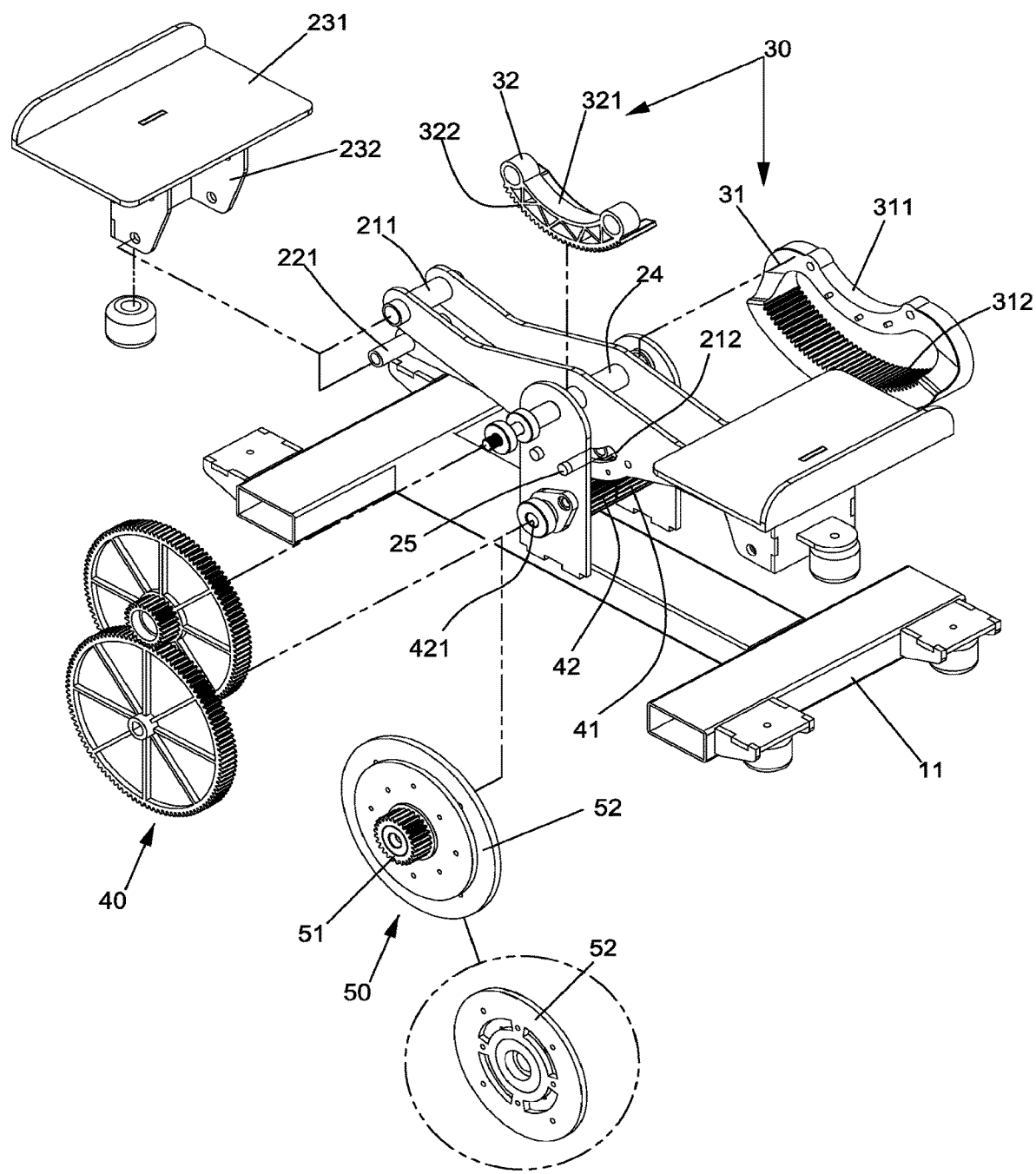
FIG. 3 and FIG. 4 are exploded view of the present invention.
Figure 4:
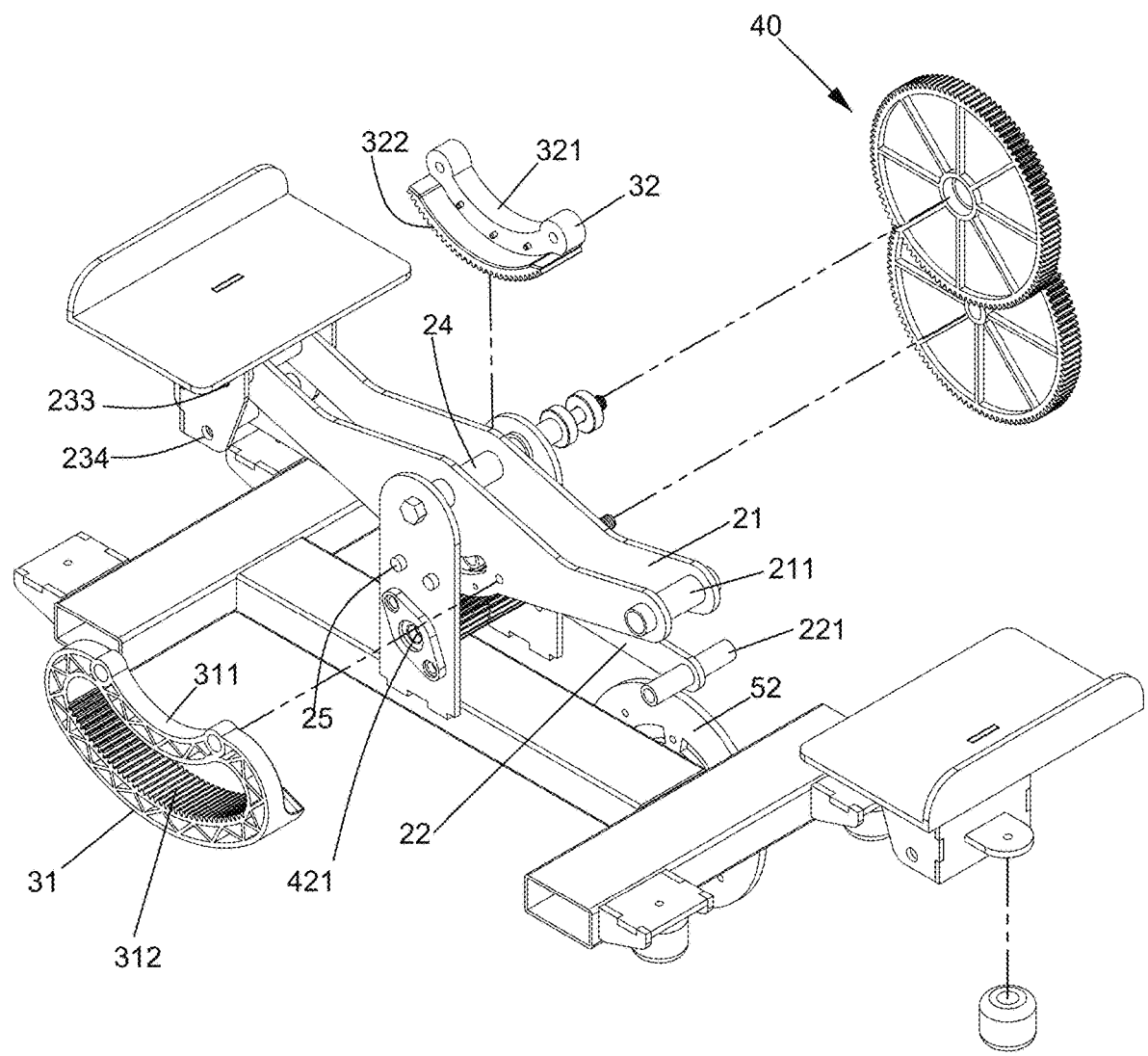
Figure 5:
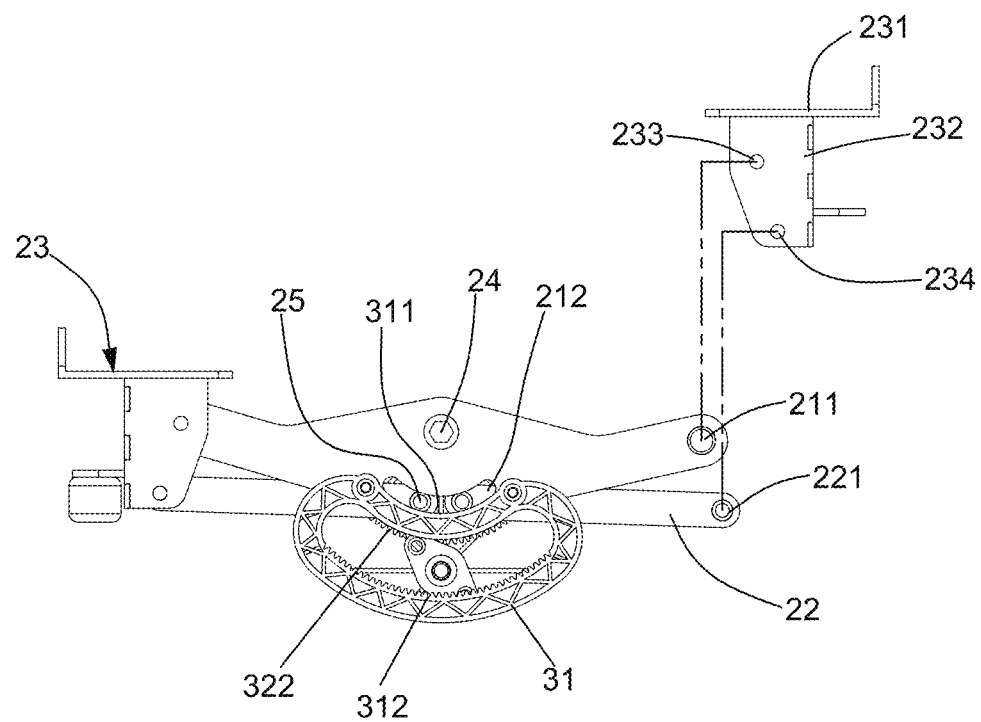
FIG. 5 is an assembled schematic view of the pedal assembly of the present invention.
Figure 6:
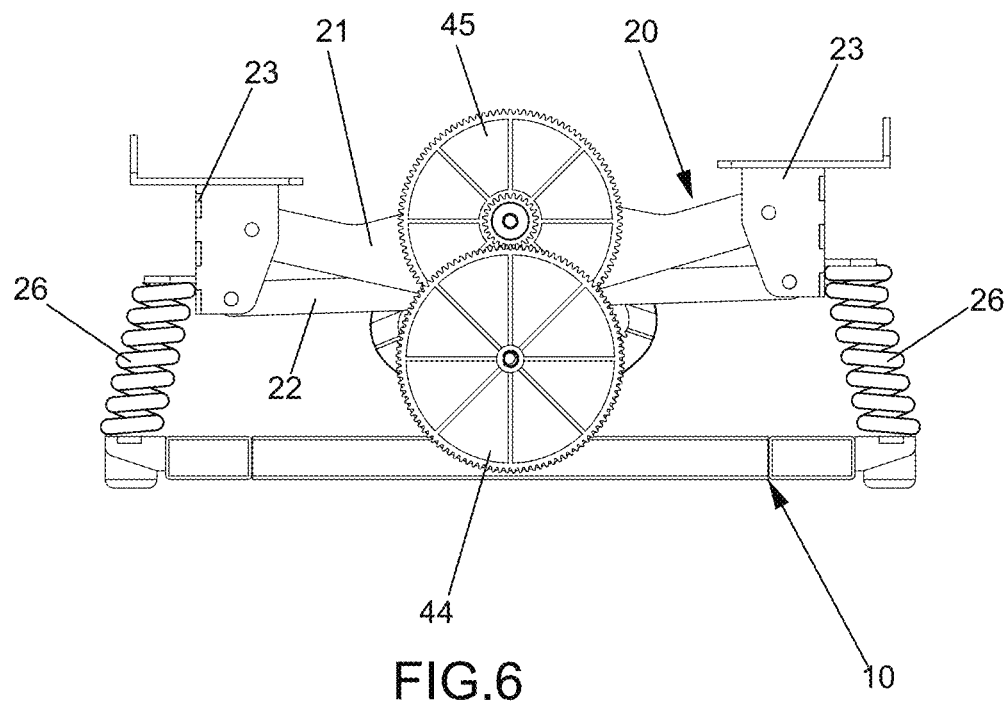
FIGS. 6-8 are schematic views of the present invention when in use.
Figure 7:
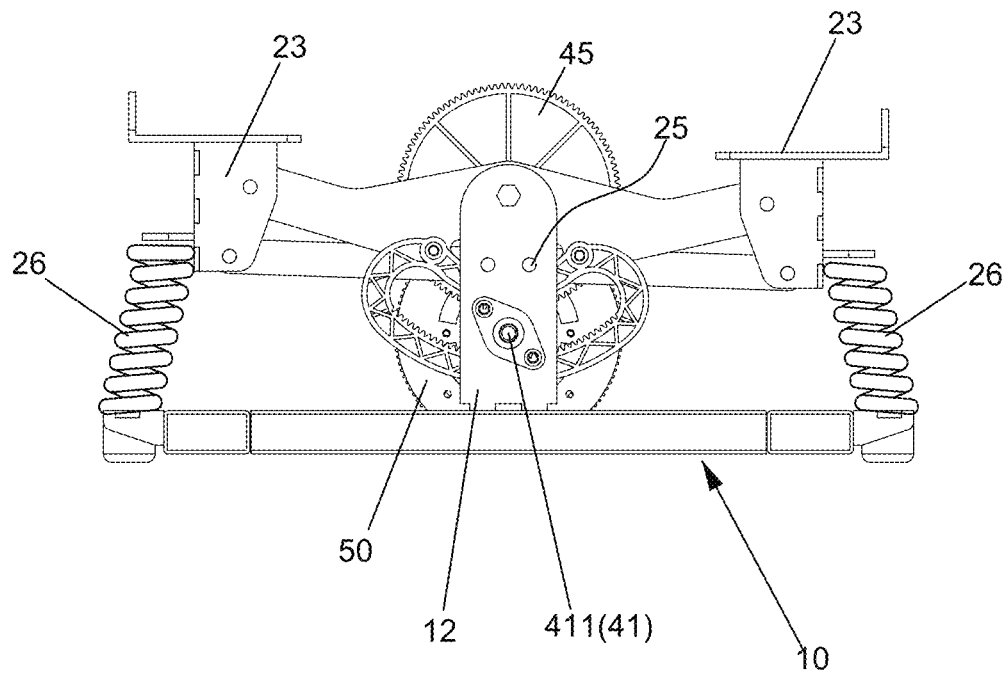
Figure 8:
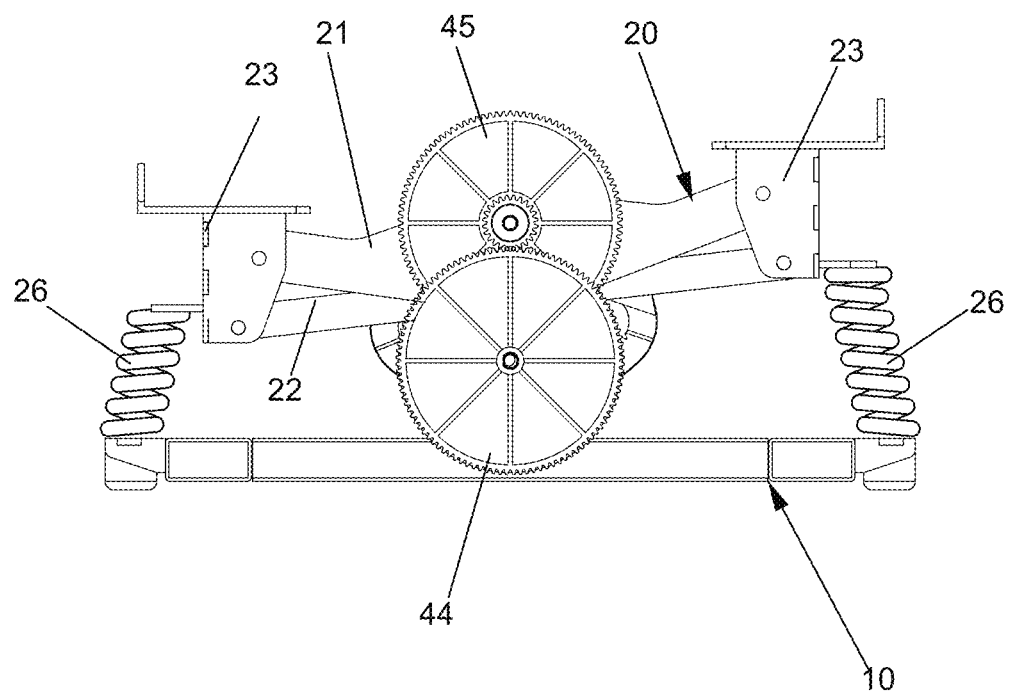
Figure 9:
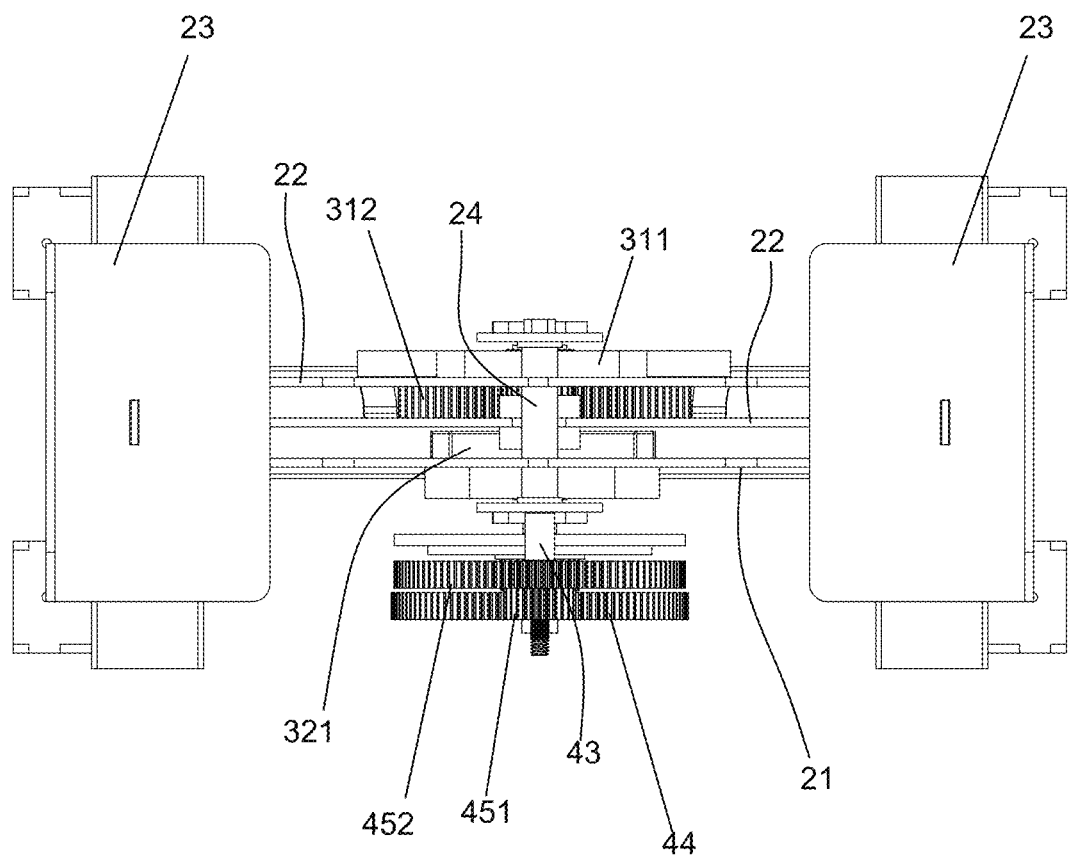
FIG. 9 is a top view of the present invention.
Figure 10:
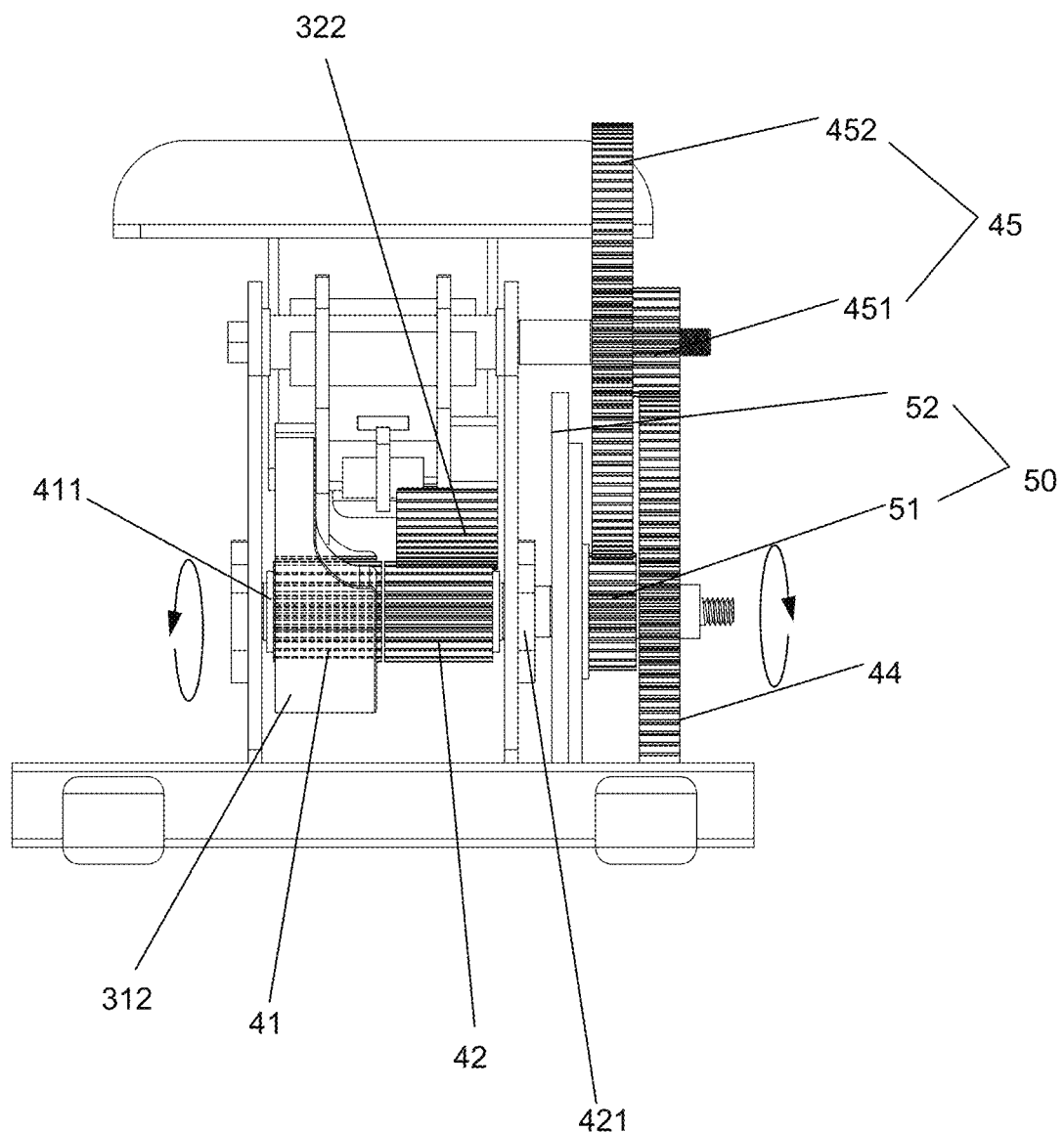
FIG. 10 a side view of the present invention when in use.

As shown in FIG. 1 to FIG. 10, the pedal assembly 20 is mounted on the seat body 10. The pedal assembly 20 includes a main rod 21, a secondary rod 22, and two pedals 23. The main rod 21 is axially connected to the support frame 12 through a first shaft 24. The first shaft 24 serves as a rotation center. Two ends of the main rod 21 are provided with first mounting portions 211, respectively. The main rod 21 is provided with a curved groove 212. The secondary rod 22 is mounted to a lower end of the main rod 21 under the first shaft 24. The secondary rod 22 is connected through at least one second shaft 25 passing through the curved groove 212 of the main rod 21. The second shaft 25 serves as a lower support member when the main rod 21 is swung. Two ends of the secondary rod 22 are provided with second mounting portions 221, respectively. Each pedal 23 has a pedal portion 231 and a connecting portion 232. The connecting portion 232 has an upper connecting hole 233 and a lower connecting hole 234. The upper connecting holes 233 of the two pedals 23 are connected with the first mounting portions 211, respectively. The lower connecting holes 234 of the two pedals 23 are connected with the second mounting portions 221, respectively. The connecting portion 232 of each pedal 23 is provided with a cushion unit 26 for the pedal 23 not to directly contact with the bottom base 11 to damage the bottom base 11. In addition, the cushion unit 26 may be an elastic cushion. As shown in FIG. 3 and FIG. 4, the cushion unit 26 may be a compression spring. In addition to the advantages described above, the compression spring has high compressive force to protect the user's ankles and knees from knee pain after a long-term use. The main rod 21, the secondary rod 22 and the two pedals 23 form a parallelogram linkage structure. When the pedal 23 at one side is exerted with a force, the pedal 23 at the other side ascends and the gear plate assembly 30 connected to the pedal assembly 20 is linked to move.

As shown in FIG. 1 to FIG. 10, the gear plate assembly 30 includes a first gear plate 31 and a second gear plate 32. The first gear plate 31 is mounted between the support frame 12 and the main rod 21. The second gear plate 32 is mounted between the secondary rod 22 and the drive assembly 40. The first gear plate 31 has a first curved surface 311 corresponding to the curved groove 212. The first curved surface 311 abuts against the lower end of the second shaft 25. The first gear plate 31 has a lower curved gear rack 312. The second gear plate 32 has a second curved surface 321. The second curved surface 321 abuts against the lower end of the second shaft 25. The second gear plate 32 has an upper curved gear rack 322. Both the upper curved gear rack 312 and the lower curved gear rack 322 use the first shaft 24 as a rotation axis and use the secondary rod 22 as the arm of rotation. When the user treads the pedals 23, the first gear plate 31 and the second gear plate 32 are pivoted relative to each other to drive the drive assembly 40 to rotate.

As shown in FIG. 1 to FIG. 10, the drive assembly 40 includes a first linking gear 41, a second linking gear 42, a first linking shaft 43, a first transmission gear 44, and a second transmission gear 45. The first linking gear 41, the second linking gear 42, the first linking shaft 43 and the first transmission gear 44 are coaxially arranged. The first linking gear 41 is meshed with the lower curved gear rack 312. The second linking gear 42 is meshed with the upper curved gear rack 322. The first linking gear 41 and the second linking gear 42 are turned in opposite directions. Unidirectional bearings 411, 421 are mounted in the first linking gear 41 and the second linking gear 42 so that the first linking shaft 43 is rotated in a single direction. The first transmission gear 44 is mounted on the first linking shaft 43. The second transmission gear 45 includes a small gear 451 and a large gear 452. The small gear 451 is meshed with the first transmission gear 44. The big gear 452 drives the eccentric assembly 50 to rotate.

As shown in FIG. 1 to FIG. 10, the eccentric assembly 50 includes an gear 51 and an eccentric block 52. The gear 51 is meshed with the big gear 452 and driven by the big gear 452 to rotate. The eccentric block 52 is mounted on the gear 51 and driven by the gear 51 to rotate, thereby generating a vibrational effect.

As shown in FIG. 1 to FIG. 10, the operation of the present invention is described hereinafter. When the user stands on the pedals 23 to tread left and right, the pedals 23 drive the main rod 21 and the secondary rod 22 to swing up and down with the first shaft 24 as a center. The first gear plate 31 and the second gear plate 32 are linked by the pedal assembly 20 to drive the first linking gear 41 and the second linking gear 42 to rotate. The first linking gear 41 and the second linking gear 42 are provided with the unidirectional bearings 411, 421 therein. The first linking gear 41 and the second linking gear 42 are rotated in different directions when driven by the gear plate assembly 30. Through the unidirectional bearings 411, 421, the first linking shaft 43 is rotated in a single direction. Therefore, when the stepping frequency is high, the structure won't be jammed and can be operated smoothly. Next, the first linking shaft 43 sequentially drives the first transmission gear 44, the second transmission gear 45 and the eccentric assembly 50 to rotate.

The eccentric assembly 50 has the eccentric block 52 to generate a vibrational effect during rotation.

Another feature of the present invention is that the first linking gear 41 and the second linking gear 42 are provided with the unidirectional bearings 411, 421. Therefore, when the stepping frequency is high, the eccentric assembly 50 can be accelerated to enhance the vibrational effect.

As shown in FIG. 1 to FIG. 10, the first transmission gear 44 and the big gear 452 each have a large number of teeth and a large size to drive the small gear 451 and the gear 51. In this way, when the user treads on the pedals 23, the drive assembly 40 drives the eccentric assembly 50 to rotate faster and faster.

Figure 11:
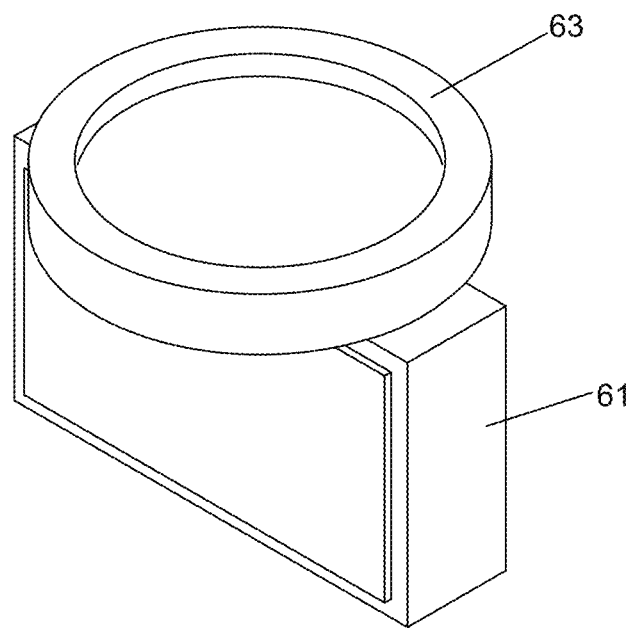
FIG. 11 and FIG. 12 are schematic views in accordance with a second embodiment of the present invention.
Figure 12:
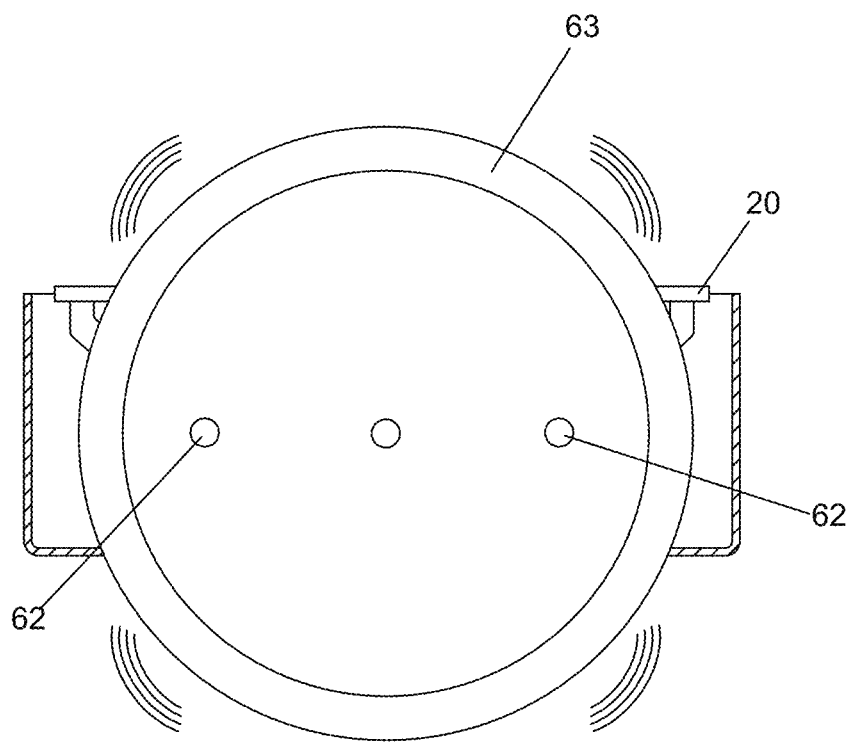

FIG. 11 and FIG. 12 illustrate a second embodiment of the present invention. The seat body 10 of the present invention is mounted with a housing 61. The first mounting portions 211 and the second mounting portions 221 extend out of an outer side of the housing 61 to form connecting shafts 62. The outer side of the housing 61 is mounted with a rotating disc 63. The rotating disc 63 is fitted on the connecting shafts 62. By rotating the rotating disc 63, the pedal assembly 20 is actuated for the eccentric assembly 50 to generate a vibrational effect.

Figure 13:
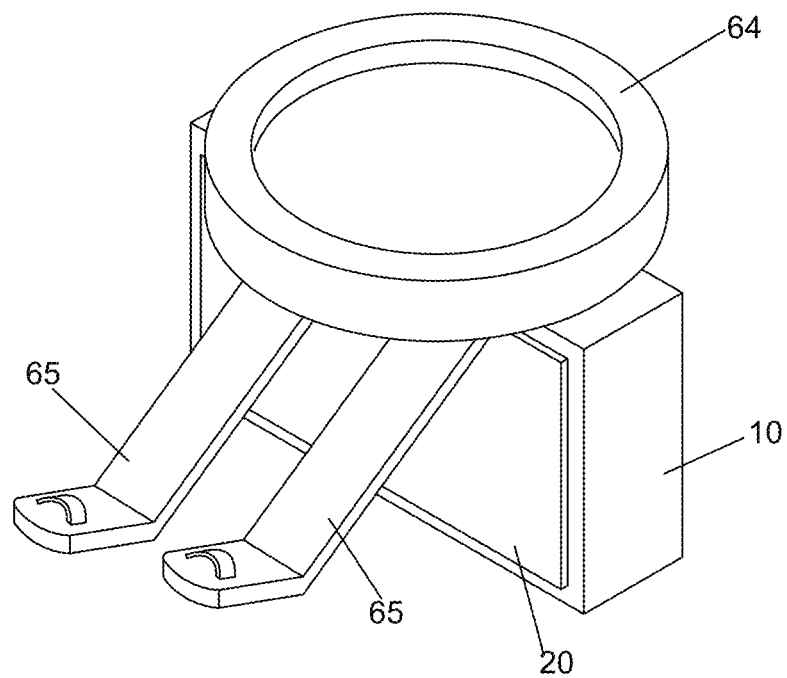
FIG. 13 and FIG. 14 are schematic views in accordance with a third embodiment of the present invention.
Figure 14:
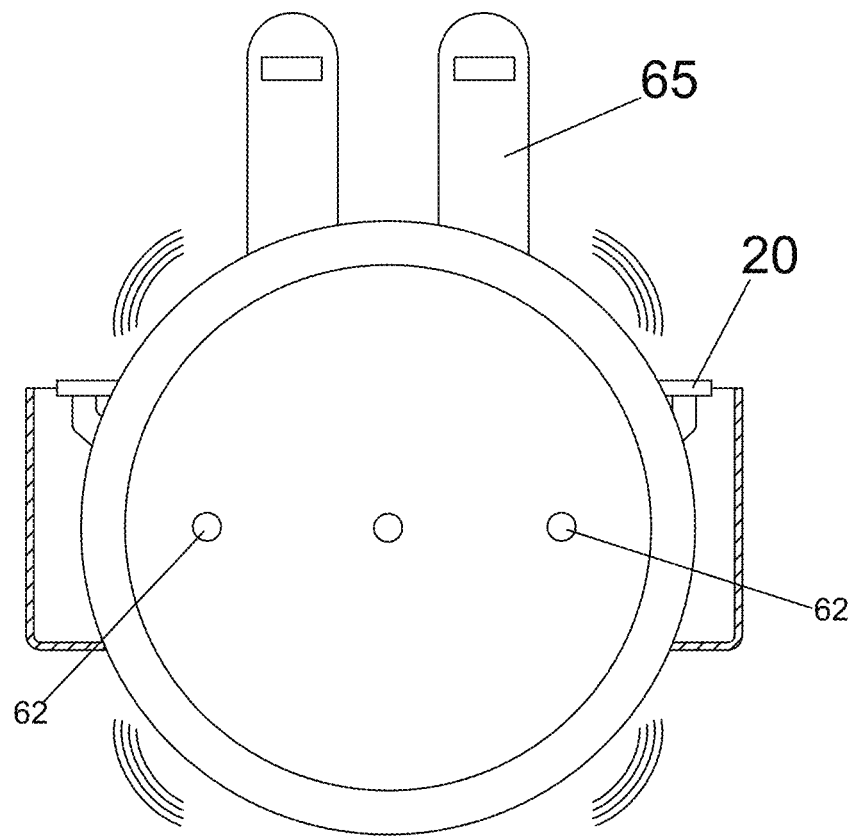

FIG. 13 and FIG. 14 illustrate a third embodiment of the present invention, which is a modified embodiment of FIG. 11. In this embodiment, the outer side of the housing 61 can be selectively connected with a rotatable seat pad 64. The seat pad 64 is provided with a bracket 65 for the user to rest his/her legs thereon. Accordingly, when the user sits on the seat pad 64 to swing his/her legs, the drive assembly 40 and the eccentric assembly 50 in the housing 61 can be driven to rotate to generate a vibrational effect.

Figure 15A:
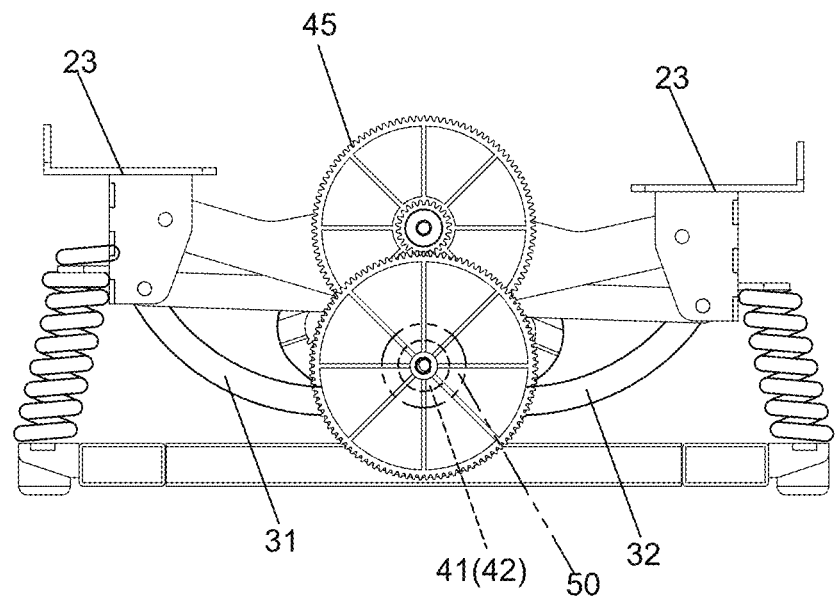
FIG. 15a and FIG. 15b are schematic views in accordance with a fourth embodiment of the present invention.
Figure 15B:
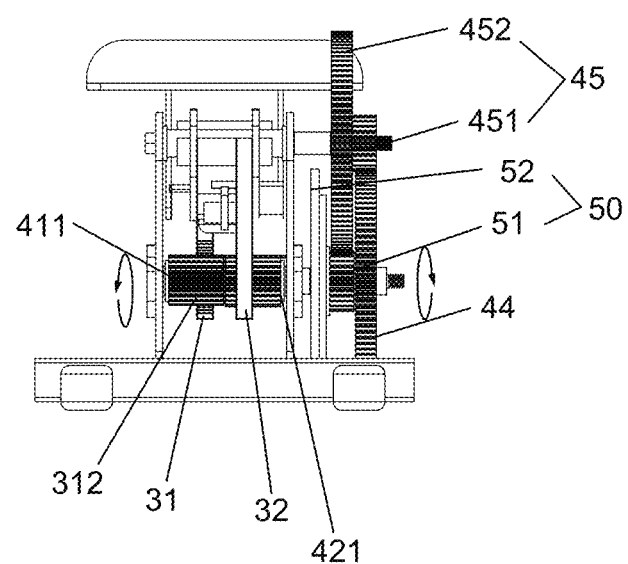

FIG. 15a and FIG. 15b illustrate a fourth embodiment of the present invention. The gear plate assembly 30 may be implemented as below. The first gear plate 31 and the second gear plate 32 of the gear plate assembly 30 are mounted to the second mounting portions 221 (both sides). When the pedals 23 are treaded, the first gear plate 31 and the second gear plate 32 use the first shaft 24 as the rotation center to drive the first linking gear 41 and the second linking gear 42 so that the drive assembly 40 can drive the eccentric assembly 50 to rotate, thereby achieving a vibrational effect.

Figure 16A:
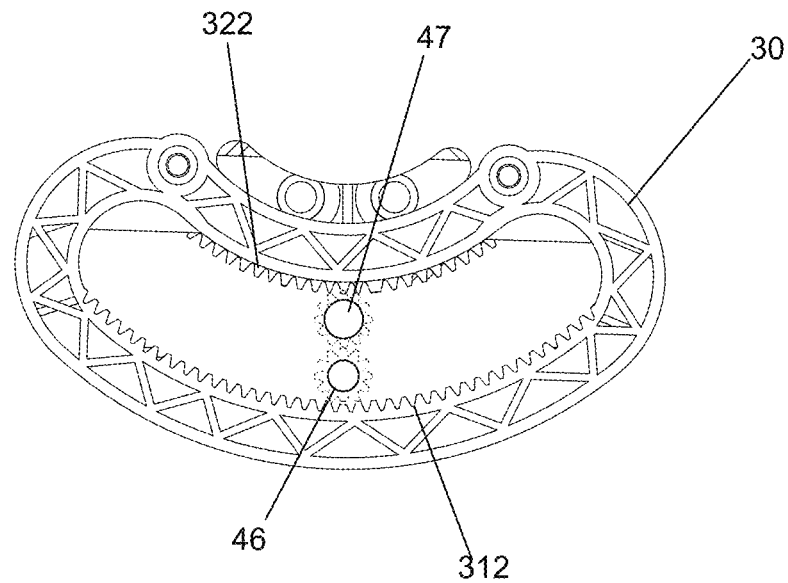
FIG. 16a and FIG. 16b are schematic views in accordance with a fifth embodiment of the present invention.
Figure 16B:
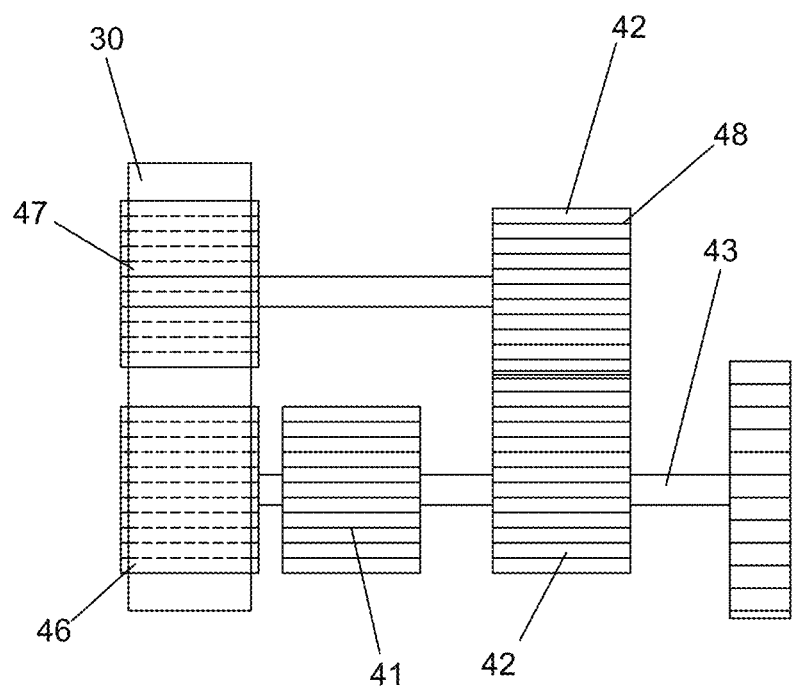

FIG. 16a and FIG. 16b illustrate a fifth embodiment of the present invention, which is a modified embodiment of the first embodiment. The gear plate assembly 30 is assembled to be one-piece, in other words, the lower curved gear rack 312 and the upper curved gear rack 322 are formed on the same gear plate. The lower curved gear rack 312 is meshed with a third linking gear 46. The upper curved gear rack 322 is meshed with a fourth linking gear 47. The first linking gear 41, the second linking gear 42 and the third linking gear 46 are coaxially arranged. The fourth linking gear 47 is axially connected with a fifth linking gear 48. The fifth linking gear 48 is meshed with the second linking gear 42. The first linking gear 41 and the second linking gear 42 are provided with the unidirectional bearings 411, 421. When the gear plate assembly 30 is driven by the pedal assembly 20, the third linking gear 46 can be driven to drive the first linking gear 41 or the second linking gear 42 to rotate in a direction. The fourth linking gear 47 and the fifth linking gear 48 also rotate toward one side. The first linking gear 41 is rotated idly in a certain direction through the unidirectional bearings 411, 412, so that the first linking shaft 43 is rotated in the same direction, providing a smooth operation.

Figure 17:
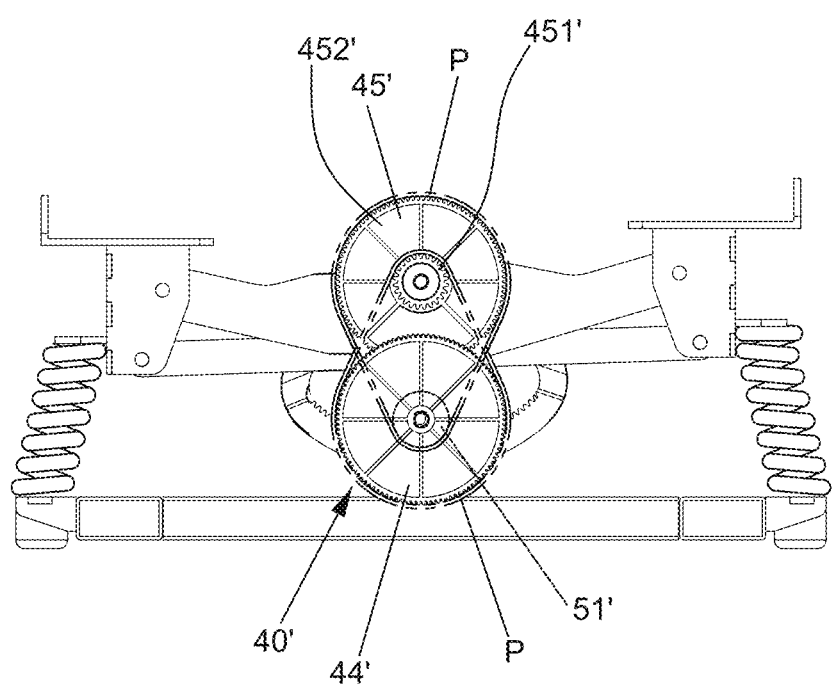
FIG. 17 is a schematic view in accordance with a sixth embodiment of the present invention.

As shown in FIG. 17, the drive assembly 40' may be implemented as the following modes. FIG. 17 shows a pulley drive. The first transmission gear 44' and the small gear 451' of the second transmission gear 45' is fitted with a transmission belt P. The big gear 452' of the second transmission gear 45' and the gear 51' are also fitted with a transmission belt P. When the drive assembly 40' is driven by the gear plate assembly 30, the drive assembly 40' drives the eccentric assembly 50 to rotate. In addition to the aforesaid transmission belt P, it may use a sprocket and a chain (not shown).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pedaling vibrational apparatus, comprising a seat body, a pedal assembly, a gear plate assembly, a drive assembly and an eccentric assembly;

the seat body including an I-shaped bottom base and a support frame, wherein the pedal assembly, the gear plate assembly, the drive assembly and the eccentric assembly are mounted to the support frame, the support frame being provided with a plurality of shaft holes for mounting the pedal assembly, the gear plate assembly, the drive assembly and the eccentric assembly;

the pedal assembly being mounted on the seat body, the pedal assembly including a main rod, a secondary rod and two pedals, the main rod being axially connected to the support frame through a first shaft, the first shaft serving as a rotation center, two ends of the main rod being provided with first mounting portions respectively, the main rod being provided with a curved groove, the secondary rod being mounted to a lower end of the main rod under the first shaft, the secondary rod being connected through at least one second shaft passing through the curved groove of the main rod, the at least one second shaft serving as a lower support member when the main rod is swung, two ends of the secondary rod being provided with second mounting portions respectively, the two pedals each having a pedal portion and a connecting portion, the connecting portion having an upper connecting hole and a lower connecting hole, the upper connecting holes of the two pedals being connected with the first mounting portions respectively, the lower connecting holes of the two pedals being connected with the second mounting portions respectively;

the gear plate assembly including a first gear plate and a second gear plate, the first gear plate being mounted between the support frame and the main rod, the second gear plate being mounted between the secondary rod and the drive assembly, the first gear plate having a first curved surface corresponding to the curved groove, the first curved surface abutting against a lower end of the at least one second shaft, the first gear plate having a lower curved gear rack; the second gear plate having a second curved surface, the second curved surface abutting against the lower end of the at least one second shaft, the second gear plate having an upper curved gear rack;

the drive assembly including a first linking gear, a second linking gear, a first linking shaft, a first transmission gear and a second transmission gear; the first linking gear, the second linking gear, the first linking shaft and the first transmission gear being coaxially arranged, the first linking gear being meshed with the lower curved gear rack, the second linking gear being meshed with the upper curved gear rack, the first linking gear and the second linking gear being turned in opposite directions, unidirectional bearings being mounted in the first linking gear and the second linking gear so that the first linking shaft is rotated in a single direction; the first transmission gear being mounted on the first linking shaft, the second transmission gear including a small gear and a large gear, the small gear being meshed with the first transmission gear, the large gear driving the eccentric assembly to rotate;

the eccentric assembly including a gear and an eccentric block, the gear being meshed with the large gear and driven by the large gear to rotate, the eccentric block being mounted on the gear and driven by the gear to rotate.

2. The pedaling vibrational apparatus as claimed in claim 1, wherein the I-shaped bottom base is provided with a plurality of cushion pads.

3. The pedaling vibrational apparatus as claimed in claim 1, wherein the connecting portion of each of the pedals is provided with a cushion unit, and the cushion unit is an elastic cushion.

4. The pedaling vibrational apparatus as claimed in claim 1, wherein the connecting portion of each of the pedals is provided with a cushion unit, and the cushion unit is a compression spring.

5. The pedaling vibrational apparatus as claimed in claim 1, wherein the first transmission gear and the large gear each have a large number of teeth and a large size to drive the small gear and the gear.

6. The pedaling vibrational apparatus as claimed in claim 1, further comprising a housing to cover the seat body, the first mounting portions and the second mounting portions extending out of an outer side of the housing to form connecting shafts, the outer side of the housing being mounted with a rotating disc, the rotating disc being fitted on the connecting shafts, by rotating the rotating disc, the pedal assembly being actuated for the eccentric assembly to generate vibrations.

7. The pedaling vibrational apparatus as claimed in claim 6, wherein the outer side of the housing is selectively connected with a rotatable seat pad, the rotatable seat pad is provided with a bracket configured for a user to rest his/her legs thereon such that when the user sits on the rotatable seat pad to swing, the drive assembly and the eccentric assembly in the housing are driven to rotate to generate the vibrations.

* * * * *